(12) United States Patent
Kamiyama

(10) Patent No.: US 11,124,061 B2
(45) Date of Patent: Sep. 21, 2021

(54) TANK CAP STRUCTURE AND SADDLE-TYPE VEHICLE

(71) Applicant: HONDA MOTOR CO., LTD., Tokyo (JP)

(72) Inventor: Takeshi Kamiyama, Wako (JP)

(73) Assignee: HONDA MOTOR CO., LTD., Tokyo (JP)

(\*) Notice: Subject to any disclaimer, the term of this patent is extended or adjusted under 35 U.S.C. 154(b) by 223 days.

(21) Appl. No.: 16/408,489

(22) Filed: May 10, 2019

(65) Prior Publication Data

US 2019/0381880 A1 Dec. 19, 2019

(30) Foreign Application Priority Data

Jun. 15, 2018 (JP) .............................. JP2018-114939

(51) Int. Cl.
*B60K 15/04* (2006.01)
*B62J 35/00* (2006.01)

(52) U.S. Cl.
CPC .. *B60K 15/0406* (2013.01); *B60K 2015/0438* (2013.01); *B60K 2015/0451* (2013.01); *B62J 35/00* (2013.01)

(58) Field of Classification Search
CPC .. B60K 15/04; B60K 15/0406; B60K 15/073; B60K 2015/03296; B60K 2015/03547;
(Continued)

(56) References Cited

U.S. PATENT DOCUMENTS

| 4,099,645 A * | 7/1978 | Muth ................. B60K 15/0406 |
| | | 220/203.12 |
| 4,102,472 A * | 7/1978 | Sloan, Jr. ........... B60K 15/0406 |
| | | 220/301 |

(Continued)

FOREIGN PATENT DOCUMENTS

| JP | 61-169055 | 10/1986 |
| JP | 63-192268 | 12/1988 |

(Continued)

OTHER PUBLICATIONS

Japanese Office Action for Japanese Patent Application No. 2018-114939 dated Oct. 15, 2019.

*Primary Examiner* — Chun Hoi Cheung
*Assistant Examiner* — Brijesh V. Patel
(74) *Attorney, Agent, or Firm* — Amin, Turocy & Watson, LLP

(57) ABSTRACT

A tank cap structure of an embodiment includes a cap body, a grip portion, a valve device, and a ratchet mechanism. The valve device includes a valve case which has a cylindrical shape about a screw axis and accommodates a float, and a valve body which has a tapered shape thinner than the valve case and extends toward an opening. The cap body includes a cylindrical receiving portion which has a cylindrical shape about the screw axis. A seal-receiving portion receiving a seal member held between the cap body and an oil filler port portion is provided on an outer circumferential surface of the cylindrical receiving portion. A valve-receiving portion receiving the valve device inserted into an inner circumference of the cylindrical receiving portion is provided on an inner circumferential surface of the cylindrical receiving portion.

6 Claims, 12 Drawing Sheets

(58) Field of Classification Search
CPC .... B60K 2015/0432; B60K 2015/0451; B60K 2015/0438; B60K 2015/0458; B60K 2015/0474; B60K 2015/0487; B60K 2015/0496; B62J 35/00; B62J 99/00; F02M 37/0076; F02M 25/089; B60Y 2200/12; B65D 55/022; F01P 11/0238
USPC ............ 220/562, 694, 86.1–86.2, 89.1–89.4, 220/DIG. 33, 303–304, DIG. 32, 203.26, 220/288, 203.23, 203.25, 203.28, 203.07, 220/203.2–203.21, 203.24; 137/43; 141/301
See application file for complete search history.

(56) References Cited

U.S. PATENT DOCUMENTS

| | | | | |
|---|---|---|---|---|
| 4,337,873 | A * | 7/1982 | Johnson | B60K 15/0406 137/493.8 |
| 4,588,102 | A * | 5/1986 | Kasugai | B60K 15/0406 137/516.29 |
| 4,666,056 | A * | 5/1987 | Kasugai | B60K 15/0406 137/516.29 |
| 4,724,868 | A * | 2/1988 | Kasugai | B60K 15/0406 137/516.29 |
| 4,785,961 | A * | 11/1988 | Kasugai | B60K 15/0406 220/203.2 |
| 4,795,053 | A * | 1/1989 | Kasugai | B60K 15/0406 220/203.2 |
| 4,795,054 | A * | 1/1989 | Brown | B60K 15/0406 220/203.2 |
| 4,807,472 | A * | 2/1989 | Brown | B60K 15/061 338/33 |
| 4,913,303 | A * | 4/1990 | Harris | B60K 15/0406 137/39 |
| 5,108,001 | A * | 4/1992 | Harris | B60K 15/0406 220/288 |
| 5,110,003 | A * | 5/1992 | MacWilliams | B60K 15/0406 220/288 |
| 5,183,173 | A * | 2/1993 | Heckman | B60K 15/0406 220/266 |
| 5,279,439 | A * | 1/1994 | Kasugai | B60K 15/0406 220/266 |
| 5,441,168 | A * | 8/1995 | Carlini | B60K 15/0406 220/266 |
| 5,520,300 | A * | 5/1996 | Griffin | B60K 15/0406 220/266 |
| 5,975,328 | A * | 11/1999 | Hagano | B60K 15/0406 220/266 |
| 5,996,830 | A * | 12/1999 | Hagano | B60K 15/0406 220/203.28 |
| 6,035,906 | A * | 3/2000 | Ott | B60K 15/04 141/301 |
| 6,648,160 | B2 * | 11/2003 | Hotch | B60K 15/0406 220/255 |
| 6,913,162 | B2 * | 7/2005 | Hagano | B60K 15/04 220/293 |
| 6,997,339 | B2 * | 2/2006 | Ueki | B60K 15/0406 220/293 |
| 7,344,042 | B2 * | 3/2008 | Hagano | F01P 11/0238 220/203.27 |
| 7,380,681 | B2 * | 6/2008 | Reutter | F01P 11/0238 220/203.27 |
| 7,543,715 | B2 * | 6/2009 | Hokazono | B60K 15/0406 220/303 |
| 8,091,724 | B2 * | 1/2012 | King | B65D 1/0246 220/296 |
| 8,113,376 | B2 * | 2/2012 | Matsubara | F02M 37/0082 220/304 |
| 9,789,760 | B2 * | 10/2017 | Mizukura | B60K 15/073 |
| 2002/0033201 | A1 * | 3/2002 | Miura | B60K 15/04 141/390 |
| 2002/0096519 | A1 * | 7/2002 | Joost | B65D 39/10 220/234 |
| 2003/0150859 | A1 * | 8/2003 | Reutter | F02M 59/102 220/203.23 |
| 2009/0242551 | A1 * | 10/2009 | Matayoshi | B62J 35/00 220/4.13 |
| 2016/0176286 | A1 * | 6/2016 | Lienenkamp | B60K 15/0406 220/86.2 |

FOREIGN PATENT DOCUMENTS

| | | |
|---|---|---|
| JP | 03-040977 | 4/1991 |
| JP | 06-040462 | 2/1994 |
| JP | 2002-002314 | 1/2002 |
| JP | 2008-265828 | 11/2008 |
| WO | 2012/127918 | 9/2012 |

* cited by examiner

TANK CAP STRUCTURE AND SADDLE-TYPE VEHICLE

CROSS-REFERENCE TO RELATED APPLICATION

Priority is claimed on Japanese Patent Application No. 2018-114939, filed on Jun. 15, 2018, the contents of which are incorporated herein by reference.

BACKGROUND

Field of the Invention

The present invention relates to a tank cap structure and a saddle-type vehicle.

Background

Japanese Unexamined Utility Model Application, First Publication No. H3-40977 discloses a structure (cap with a float valve) in which an air hole is formed in a cap closing an oil filler port of a fuel tank, a float is installed inside the fuel tank, and a valve for closing the air hole of the cap at a risen position of the float is joined to the float.

Japanese Unexamined Patent Application, First Publication No. H6-40462 discloses a structure in which a ratchet mechanism allowing turning in one direction between an outer cap and an inner cap is provided as a tank cap (cap for a resin tank) for a resin fuel tank.

SUMMARY

There is a problem in that a tank cap is likely to be increased in size when a cap with a float valve and a cap for a resin tank are integrated.

According to an aspect of the present invention, in a tank cap structure including a float and a ratchet mechanism, while increase in size of a tank cap is curbed, a float having sufficient buoyancy is disposed.

(1) A tank cap structure according to an aspect of the present invention includes a cap body that is screwed to an oil filler port portion of a fuel tank and blocks an oil filler port; a grip portion that is provided so as to be relatively rotatable around a screw axis with respect to the cap body; a valve device that operates a float in accordance with a fuel level position and opens and closes an opening restricting an outflow of fuel; and a ratchet mechanism that is provided between the grip portion and the cap body and manages a fastening torque of the cap body. The valve device includes a valve case which has a cylindrical shape about the screw axis and accommodates the float, and a valve body which has a tapered shape thinner than the valve case and extends toward the opening. The cap body includes a cylindrical receiving portion which has a cylindrical shape about the screw axis. A seal-receiving portion receiving a seal member held between the cap body and the oil filler port portion is provided on an outer circumferential surface of the cylindrical receiving portion. A valve-receiving portion receiving the valve device inserted into an inner circumference of the cylindrical receiving portion is provided on an inner circumferential surface of the cylindrical receiving portion.

(2) In the tank cap structure, the valve device may include a biasing member which biases the float in an operation direction of the float.

(3) In the tank cap structure, the cap body may include a body extension portion which has a cylindrical shape extending downward along the screw axis from the cylindrical receiving portion. The valve case may include a case extension portion which has a cylindrical shape extending upward along the screw axis such that the case extension portion overlaps the body extension portion in a radial direction. The tank cap structure may further include a restraint member that restrains an overlapping portion between the body extension portion and the case extension portion in the radial direction from the outside in the radial direction.

(4) In the tank cap structure, the cap body may be constituted of two members such as a first member having the cylindrical receiving portion and a second member having the body extension portion.

(5) In the tank cap structure, the cap body may include a screw cylinder which is positioned outward from the cylindrical receiving portion in the radial direction and in which a thread to be screwed to the oil filler port portion is formed on an inner circumference. The cylindrical receiving portion may be positioned inside the oil filler port over an upper end of the oil filler port portion.

(6) In the tank cap structure, the oil filler port portion may be made of a resin. The thread may be formed by a trapezoidal screw portion having a trapezoidal shape.

(7) A saddle-type vehicle according to another aspect of the present invention includes the tank cap structure.

According to the configuration of (1) described above, since the seal-receiving portion receiving the seal member held between the cap body and the oil filler port portion is provided on the outer circumferential surface of the cylindrical receiving portion, while airtightness of the seal member can be ensured by the seal-receiving portion, increase in size of a tank cap in a height direction can be curbed. Moreover, since the valve-receiving portion receiving the valve device inserted into the inner circumference of the cylindrical receiving portion is provided on the inner circumferential surface of the cylindrical receiving portion, increase in size of the tank cap in the height direction can be curbed while an advantage that the valve device can be positionally aligned by the valve-receiving portion is achieved. That is, while airtightness of the seal member can be ensured and the valve device can be positionally aligned, increase in size of the tank cap in the height direction can be curbed by the inner and outer circumferences of the cylindrical receiving portion. Therefore, while increase in size of the tank cap is curbed, a float having sufficient buoyancy can be disposed.

According to the configuration of (2) described above, since the valve device includes the biasing member which biases the float in the operation direction of the float, leakage of fuel through the opening can be prevented when the fuel tank tilts.

According to the configuration of (3) described above, since the tank cap structure further includes the restraint member that restrains the overlapping portion between the body extension portion and the case extension portion in the radial direction from the outside in the radial direction, the vibration durability of the tank cap is improved.

According to the configuration of (4) described above, since the cap body is constituted of two members such as the first member having the cylindrical receiving portion and the second member having the body extension portion, the following effects are exhibited. Facilitation of making a tank cap and improvement of dimensional accuracy (prevention of shrinkage of a resin thick-wall portion) are achieved in parallel, so that productivity is improved.

According to the configuration of (5) described above, since the cap body includes the screw cylinder which is positioned outward from the cylindrical receiving portion in the radial direction and in which the thread to be screwed to the oil filler port portion is formed on the inner circumference, and the cylindrical receiving portion is positioned inside the oil filler port over the upper end of the oil filler port portion, the following effects are exhibited. Due to the structure in which the cylindrical receiving portion of the cap body is inserted deep into the oil filler port, while a fastening force of a screwed portion between the cap body and the oil filler port portion is enhanced, the width of the seal-receiving portion can be ensured. Therefore, attachment strength and sealing efficiency of the cap body can be achieved in parallel.

According to the configuration of (6) described above, since the oil filler port portion is made of a resin, and the thread is formed by the trapezoidal screw portion having a trapezoidal shape, the following effects are exhibited. Sufficient attachment strength and sealing efficiency can be achieved for the oil filler port portion made of a resin exhibiting a significant dimensional change in response to temperature change.

According to the configuration of (7) described above, since the saddle-type vehicle includes the tank cap structure, while increase in size of the tank cap is curbed, a float having sufficient buoyancy can be disposed.

DESCRIPTION OF THE EMBODIMENTS

Hereinafter, an embodiment of the present invention will be described with reference to the drawings. Unless otherwise specified, directions to the front, the rear, the left, and the right in the following description are the same as the directions in a vehicle described below. At suitable places in the diagrams used in the following description, an arrow FR indicating the front side of the vehicle, an arrow LH indicating the left side of the vehicle, and an arrow UP indicating the upper side of the vehicle are illustrated.

<Entirety of Vehicle>

Figure 1:
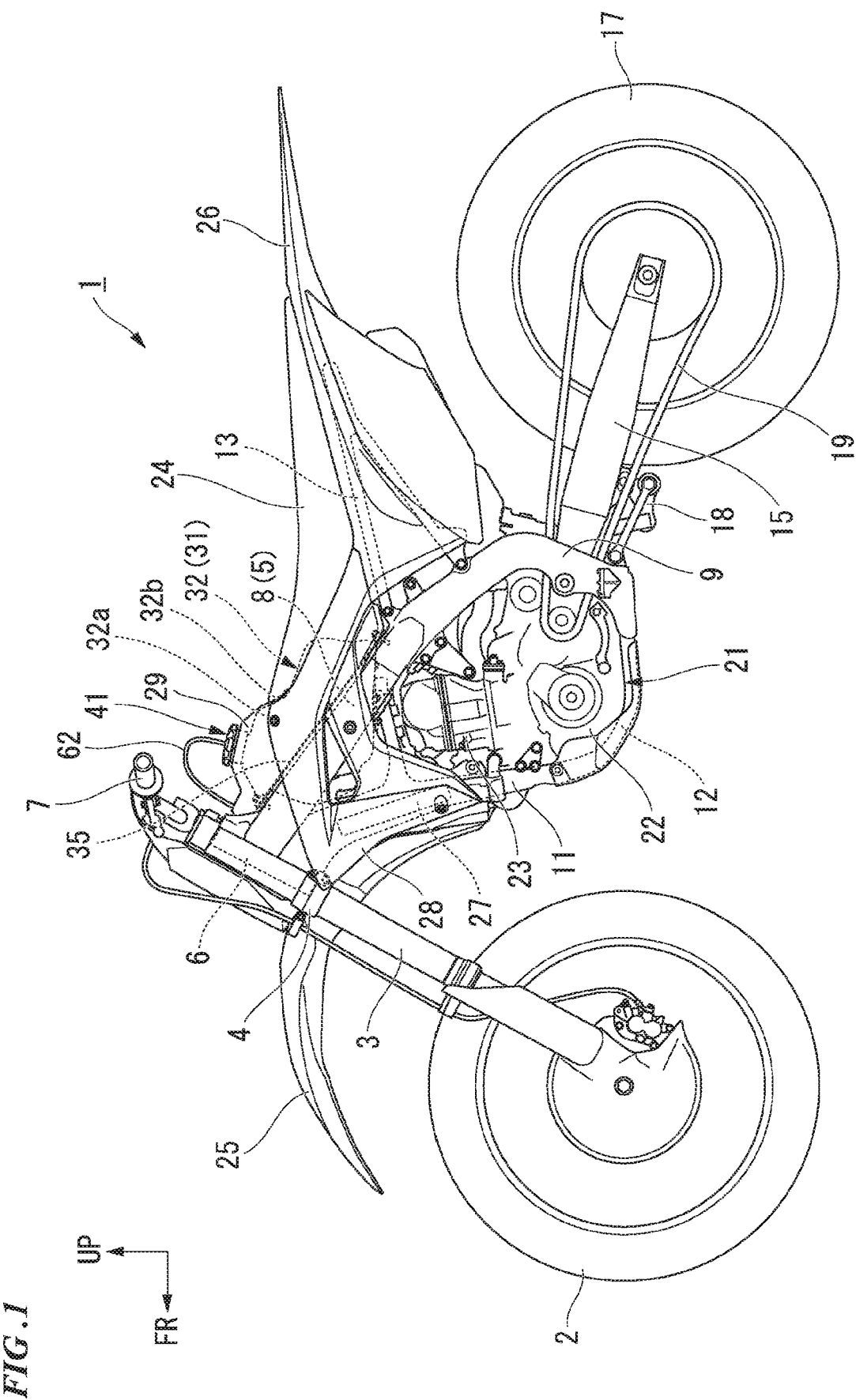
FIG. 1 is a left-side view of a motorcycle according to an embodiment.

FIG. 1 illustrates an off-road motorcycle 1 as an example of a saddle-type vehicle. A front wheel 2 of the motorcycle 1 pivots on the lower end portion of left and right front forks 3. The upper portions of the left and right front forks 3 are supported in a steerable manner by a head pipe 6 of a vehicle body frame 5 with a steering stem 4 interposed therebetween. A bar-type handle bar 7 is attached to the upper portion of the steering stem 4.

The vehicle body frame 5 includes the head pipe 6, a pair of left and right main tubes 8, a pair of left and right pivot frames 9, a single down frame 11, a pair of left and right lower frames 12, and a seat frame 13.

In a side view, the head pipe 6 extends in a tilted manner such that it is positioned upward toward the rear side.

The left and right main tubes 8 extend downward to the rear from the rear upper portion of the head pipe 6.

The rear end portion of the right main tube 8 leads to the upper end portion of the right pivot frame 9 in an intermediate portion of a vehicle body in the front-rear direction. The rear end portion of the left main tube 8 leads to the upper end portion of the left pivot frame 9 in the intermediate portion of the vehicle body in the front-rear direction.

The single down frame 11 extends obliquely downward to the rear from the rear lower portion of the head pipe 6 with a steeper inclination than the left and right main tubes 8.

The right lower frame 12 branches to the right from the lower end portion of the down frame 11 and extends obliquely downward to the rear. The left lower frame 12 branches to the left from the lower end portion of the down frame 11 and extends obliquely downward to the rear. The lower portions of the left and right lower frames 12 are curved rearward. The rear portion of the right lower frame 12 is connected to the lower end portion of the right pivot frame 9. The rear portion of the left lower frame 12 is connected to the lower end portion of the left pivot frame 9.

The seat frame 13 is connected to the rear portions of the left and right main tubes 8.

The vehicle body frame 5 constitutes a twin-spar cradle frame. An engine 21, which is a motor of the motorcycle 1, is mounted in an inner side portion of the vehicle body frame 5.

The term "intermediate" used in the present embodiment means not only a central part between both ends of a target but also an inner range between both ends of a target.

The front end portion (base end portion) of a swing arm 15 is supported by the lower portions of the left and right pivot frames 9 in a vertically oscillatable manner. A rear wheel 17 of the motorcycle 1 pivots on the rear end portion of the swing arm 15. The lower end portion of a rear cushion (not illustrated) is joined to the front lower portion of the swing arm 15 via a link mechanism 18. The upper end portion of the rear cushion is joined to a cross member (not illustrated) which traverses an area between parts in the vicinity of the rear end portions of the left and right main tubes 8.

The engine 21 is a single cylinder engine having a crankshaft parallel to the vehicle width direction (left-right direction). The lower portion of the engine 21 constitutes a crankcase 22. A cylinder 23 stands upright in the front upper portion of the crankcase 22 in a substantially vertical manner.

A throttle body (not illustrated) of an engine intake system is connected to the rear portion of the cylinder 23. An exhaust pipe (not illustrated) of an engine exhaust system is connected to the front portion of the cylinder 23.

The rear portion of the crankcase 22 also serves as a transmission case accommodating a clutch and a transmission. An output shaft of the transmission protrudes in the left side portion of the rear portion of the crankcase 22. The output shaft and the rear wheel 17 are joined to each other via a chain-type power transmission mechanism 19.

A fuel tank 31 is provided above the cylinder 23 and between the left and right main tubes 8. A seat 24 is provided behind the left and right main tubes 8 and above the seat frame 13. The seat 24 extends to the front and the rear. The front portion of the seat 24 is supported by the upper surface of the rear portion of the fuel tank 31.

A front fender 25 is supported by a bottom bridge of the steering stem 4. A rear fender 26 extends to the rear of the seat 24. A pair of left and right radiators 27 are disposed on both sides of the down frame 11. A pair of left and right shrouds 28 cover a range to the front on the side surfaces of the left and right radiators 27 from the side surfaces of the fuel tank 31.

<Fuel Tank>

The fuel tank 31 is disposed on the inner side between the left and right main tubes 8 in the vehicle width direction. The upper half portion of the fuel tank 31 is positioned above the upper surfaces of the left and right main tubes 8. The front portion of the fuel tank 31 bulges upward. An oil filler cap 41 (tank cap structure) for opening and closing an oil filler port is provided in the upper end portion of the front portion of the fuel tank 31.

Figure 3:
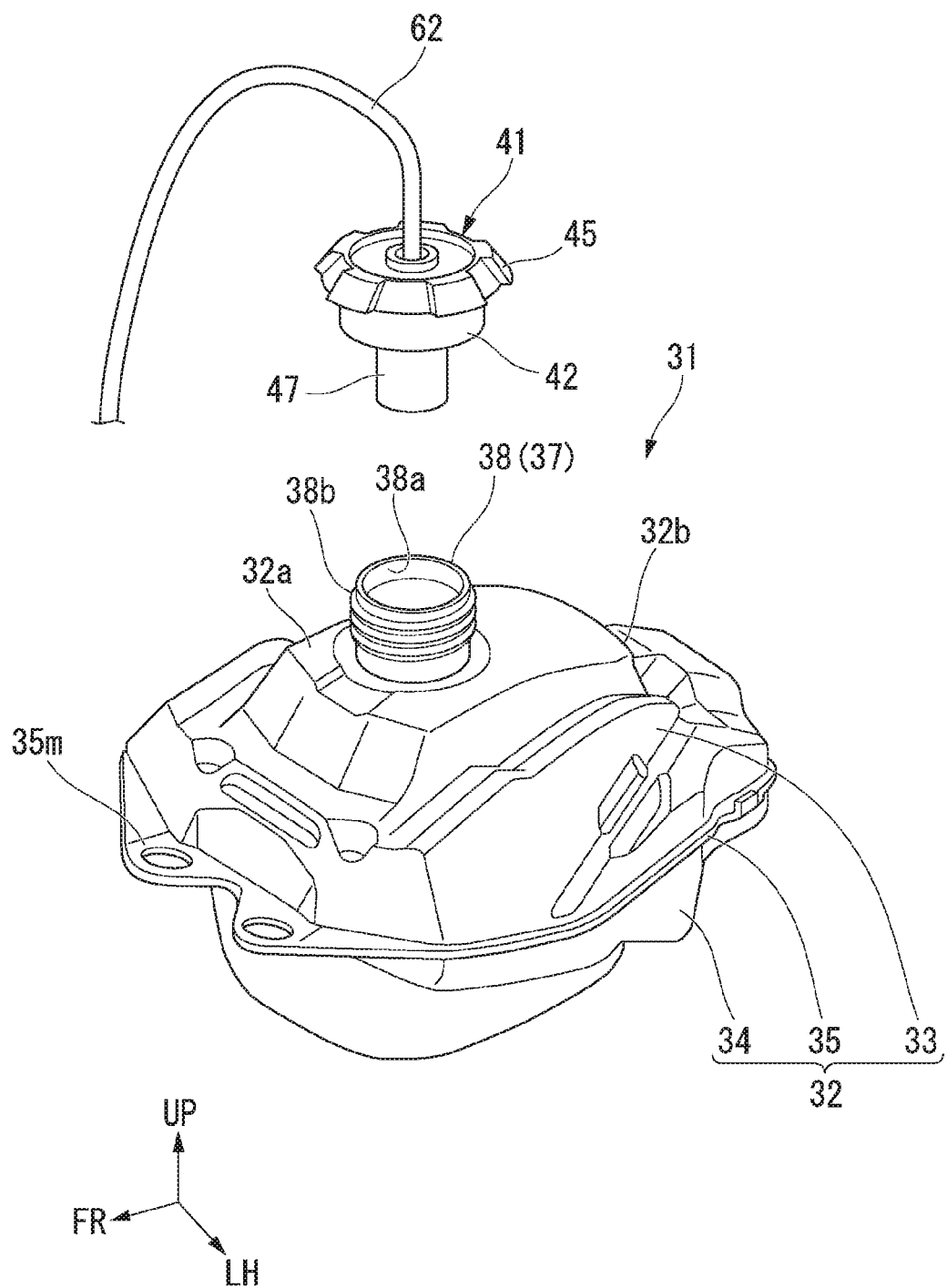
FIG. 3 is a perspective view of the fuel tank according to the embodiment.

As illustrated in FIG. 3, the fuel tank 31 includes a tank main body 32 having a hollow structure. For example, the tank main body 32 is made of a resin. The tank main body 32 includes an upper half body 33 forming the upper portion of the tank main body 32, and a lower half body 34 forming the lower portion of the tank main body 32. The tank main body 32 forms an integrated hollow structure with the upper and lower half bodies 33 and 34 integrally subjected to blow molding.

A division surface between the upper and lower half bodies 33 and 34 in the tank main body 32 is inclined downward to the rear along the upper surfaces of the main tubes 8 (refer to FIG. 1). An attachment flange 35 is provided between the upper and lower half bodies 33 and 34 along the division surface.

A front mount portion 35*m* for rubber-mounting the front portion of the fuel tank 31 to the vehicle body frame 5 is provided in the front portion of the attachment flange 35.

A rear mount portion (not illustrated) for rubber-mounting the rear portion of the fuel tank 31 to the vehicle body frame 5 (refer to FIG. 1) is provided in the rear portion of the attachment flange 35.

In a state in which the fuel tank 31 is mounted in the vehicle body frame 5 (refer to FIG. 1) (frame mounted state), the upper half body 33 above the attachment flange 35 is disposed above the upper surfaces of the main tubes 8.

Figure 2:
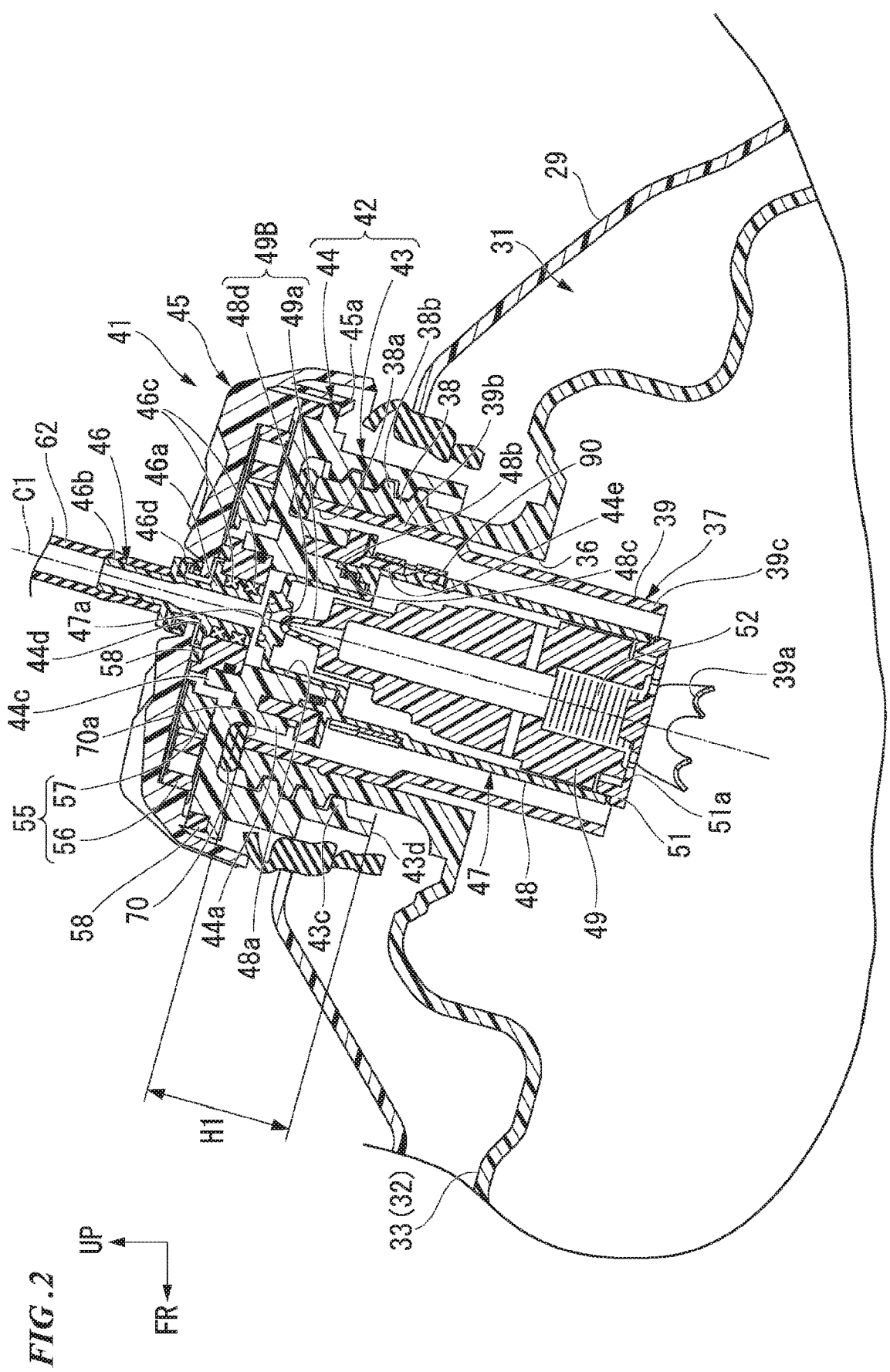
FIG. 2 is a cross-sectional view of a part around an oil filler port of a fuel tank according to the embodiment.

As illustrated in FIG. 2, a circular insertion port 36 which is open upward is formed in the upper end portion of the upper half body 33. The insertion port 36 is positioned in the middle of the upper end portion of the upper half body 33 in the vehicle width direction. An oil filler port cylinder body 37 (oil filler port portion) having a cylindrical shape is molded integrally with the insertion port 36. The oil filler port cylinder body 37 is made of a resin. Hereinafter, a center axis line C1 of the oil filler port cylinder body 37 will also be referred to as a screw axis C1.

The oil filler port cylinder body 37 integrally has a cylindrical cap-fitting portion 38 which protrudes above the tank main body 32; and a downward extending portion 39 which has a cylindrical shape with a smaller diameter than the cap-fitting portion 38, extends downward from the inside of the cap-fitting portion 38, and faces the inside of the tank main body 32. The upper end opening of the oil filler port cylinder body 37 constitutes an oil filler port 38*a*. A nozzle regulation member 39*a* controlling the insertion amount of an oil supply nozzle is provided in the lower end opening of the oil filler port cylinder body 37.

Threads 38*b* for screwing the oil filler cap 41 are formed in the outer circumference of the cap-fitting portion 38. The downward extending portion 39 includes a first cylinder portion 39*b* which has a cylindrical shape with the outer circumferential surface along the inner circumferential surface of the cap-fitting portion 38; and a second cylinder portion 39*c* which has a cylindrical shape with a smaller diameter than the first cylinder portion 39*b*, extends downward from the inside of the cap-fitting portion 38, and faces the inside of the tank main body 32. A projection portion which can engage with a recessed portion on the inner circumferential surface of the cap-fitting portion 38 is integrally provided on the outer circumferential surface of the first cylinder portion 39*b*. The downward extending portion 39 functions as a nozzle guide member which guides the oil supply nozzle. The downward extending portion 39 is inserted into the tank through the insertion port 36.

For example, the front upper portion (around the oil filler port cylinder body 37) of the fuel tank 31 is covered with a resin top shelter 29. The oil filler cap 41 of the fuel tank 31 is exposed to a top shelter 29. The left and right side portions of the fuel tank 31 are covered with the rear portions of resin shrouds 28 (refer to FIG. 1). As illustrated in FIG. 3, a bulge-shaped portion 32*a* having a shape bulging upward is provided in the front upper portion (around the oil filler port cylinder body 37) of the upper half body 33 of the fuel tank 31. The bulge-shaped portion 32*a* is formed so as to be decreased in size in a horizontal cross-sectional area while going upward toward the oil filler port cylinder body 37. A seat alignment portion 32*b*, which is inclined downward to the rear and on which the front portion of the seat 24 is mounted, is formed in the rear portion of the bulge-shaped portion 32*a*.

<Evaporated Fuel-Processing Apparatus>

Figure 5:
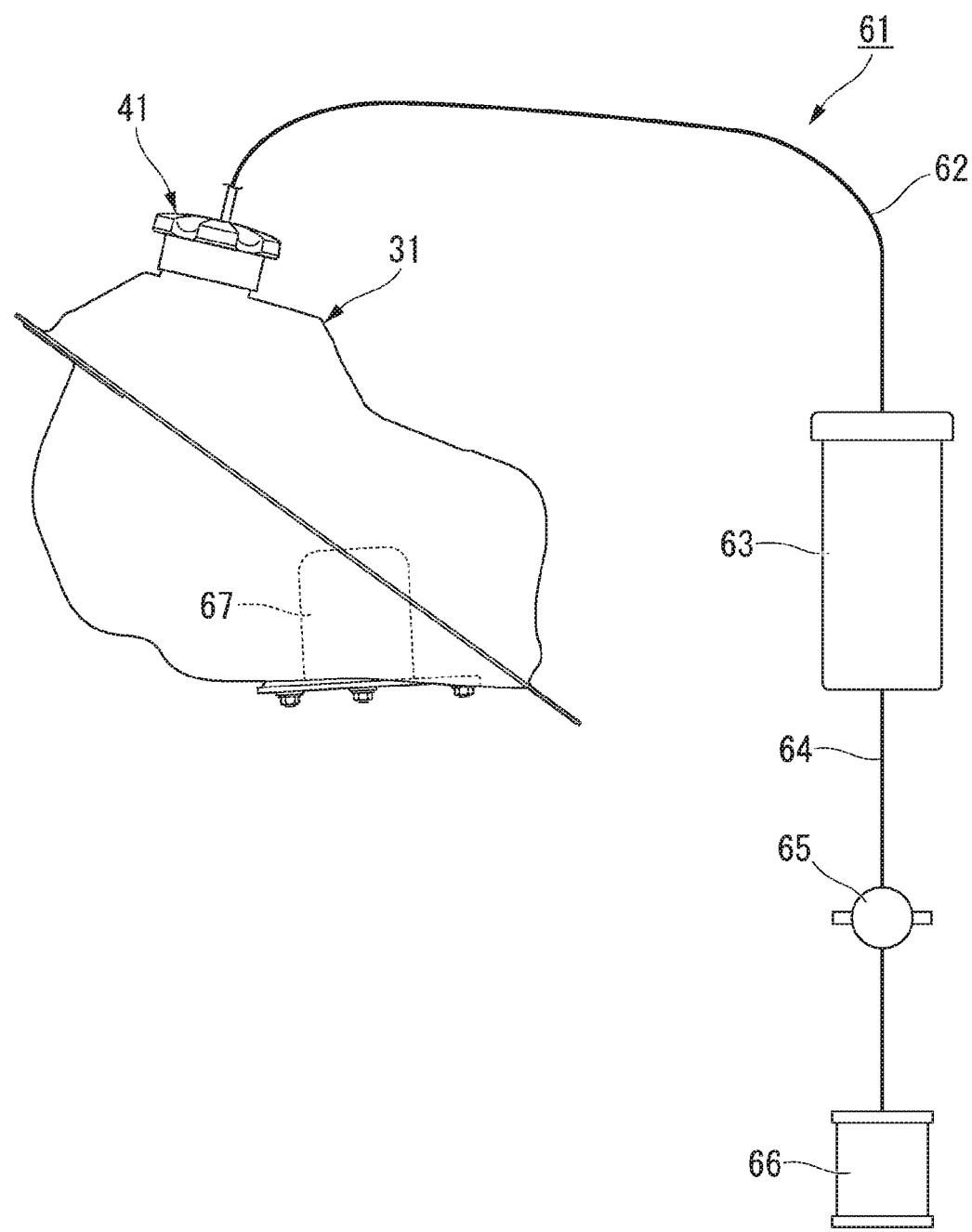
FIG. 5 is a view of a configuration of an evaporated fuel-processing apparatus according to the embodiment.

As illustrated in FIG. 5, an evaporated fuel-processing apparatus 61 includes the fuel tank 31, a charge piping 62, a canister 63 (evaporated fuel reservoir), a purge piping 64, and a purge control valve 65.

For example, the charge piping 62 is a rubber hose. A first end portion of the charge piping 62 is connected to the oil filler cap 41 of the fuel tank 31.

The canister 63 is connected to a second end portion of the charge piping 62 outside the fuel tank 31.

The first end portion of the purge piping 64 is connected to the canister 63.

The second end portion of the purge piping 64 is connected to a throttle body 66. The purge piping 64 allows the canister 63 and the throttle body 66 to communicate with each other.

The purge control valve 65 is provided in the purge piping 64. The purge control valve 65 opens and closes a flow channel of the purge piping 64 in accordance with control of an engine control unit.

A fuel pump 67 is provided in the fuel tank 31.

The oil filler cap 41 includes a ventilation passage portion 46 allowing the inside of the fuel tank 31 and the outside to communicate with each other (refer to FIG. 2). Evaporated fuel generated inside the fuel tank 31 is guided to the outside of the fuel tank 31 via the ventilation passage portion 46.

An adsorbent (not illustrated) such as activated carbon is accommodated inside the canister 63. The canister 63 adsorbs and reserves evaporated fuel sent from the charge piping 62.

<Oil Filler Cap>

Figure 11:
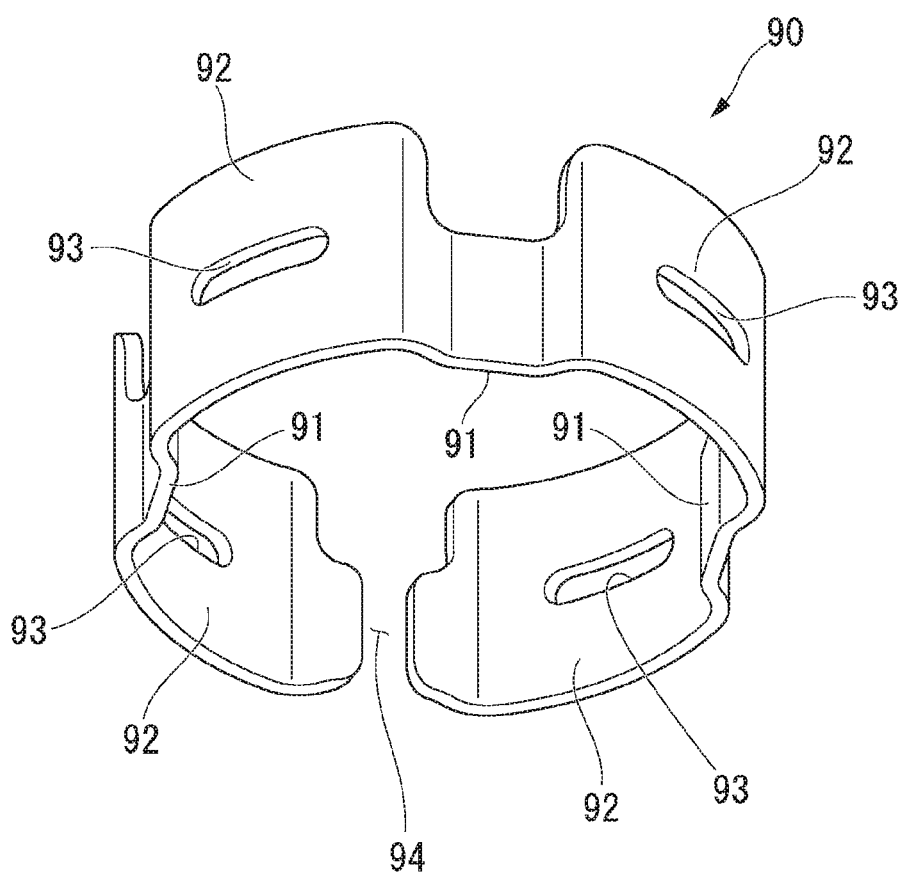
FIG. 11 is a perspective view of a restraint member according to the embodiment.

As illustrated in FIG. 2, the oil filler cap 41 (tank cap) includes a cap body 42, a grip portion 45, the ventilation passage portion 46, a valve device 47, a ratchet mechanism 55, and a restraint member 90 (refer to FIG. 11).

<Cap Body>

Figure 6:
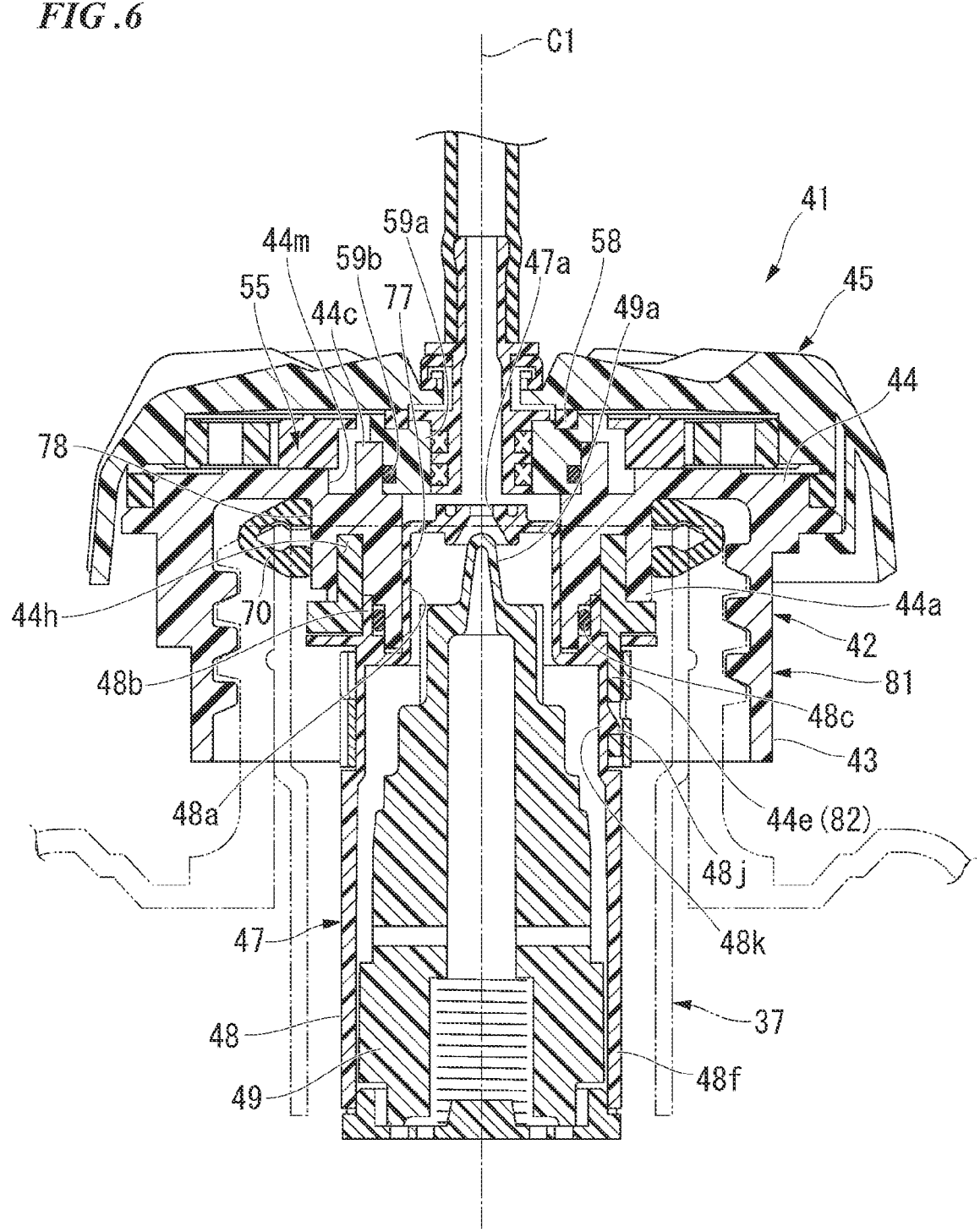
FIG. 6 is a cross-sectional view of a tank cap structure according to the embodiment.

As illustrated in FIG. 6, the cap body 42 is screwed to the oil filler port cylinder body 37 and blocks the oil filler port 38a. The cap body 42 includes a screw cylinder 43, a disk portion 44, a lower collar portion 44a (which will hereinafter be referred to as "a cylindrical receiving portion 44a), an upper collar portion 44c, and a body extension portion 44e. In FIG. 6, the oil filler port cylinder body 37 is indicated with an imaginary line.

The cap body 42 is constituted of two members such as a first member 81 having the screw cylinder 43, the disk portion 44, and the lower collar portion 44a; and a second member 82 having the body extension portion 44e. The screw cylinder 43, the disk portion 44, and the lower collar portion 44a are integrally formed as the same member. The second member 82 is individually formed so as to be independent from the first member 81.

The cap body 42 is made by combining the first member 81 and the second member 82.

As illustrated in FIG. 2, the screw cylinder 43 has a cylindrical shape coaxial with the oil filler port cylinder body 37. Threads corresponding to the threads 38b of the oil filler port cylinder body 37 are formed in the inner circumference of the screw cylinder 43.

The threads are formed by trapezoidal screw portions 43j (which will hereinafter be simply referred to as "screw portions 43j") having a trapezoidal shape (refer to FIG. 8).

The disk portion 44 has a disk shape blocking the upper end opening of the screw cylinder 43.

Since the screw cylinder 43 of the cap body 42 is screwed to the outer circumferences of the threads 38b of the oil filler port cylinder body 37, the screw cylinder 43 is increased in diameter and the ratchet mechanism 55 has favorable layout efficiency. The degree of freedom in setting a torque can be enhanced by increasing the diameter of the ratchet mechanism 55.

As illustrated in FIG. 6, the lower collar portion 44a has a double wall structure (double cylinder structure) protruding downward from the lower surface of the disk portion 44. The upper end portion of the valve device 47 is attached to the lower collar portion 44a. A valve-receiving portion 77 receiving the valve device 47 inserted into the inner circumference of the lower collar portion 44a is provided on the inner circumferential surface of the lower collar portion 44a. A seal-receiving portion 78 a seal member 70 held between the cap body 42 and the oil filler port cylinder body 37 (refer to FIG. 2) is provided on the outer circumferential surface of the lower collar portion 44a. A gap 44h is provided between double walls of the lower collar portion 44a.

The upper collar portion 44c has a cylindrical shape protruding upward from the upper surface of the disk portion 44.

The upper collar portion 44c has a smaller external shape than the lower collar portion 44a. The upper collar portion 44c has a smaller protrusion height than the lower collar portion 44a. The ratchet mechanism 55 is provided in the outer circumference of the upper collar portion 44c.

Figure 8:
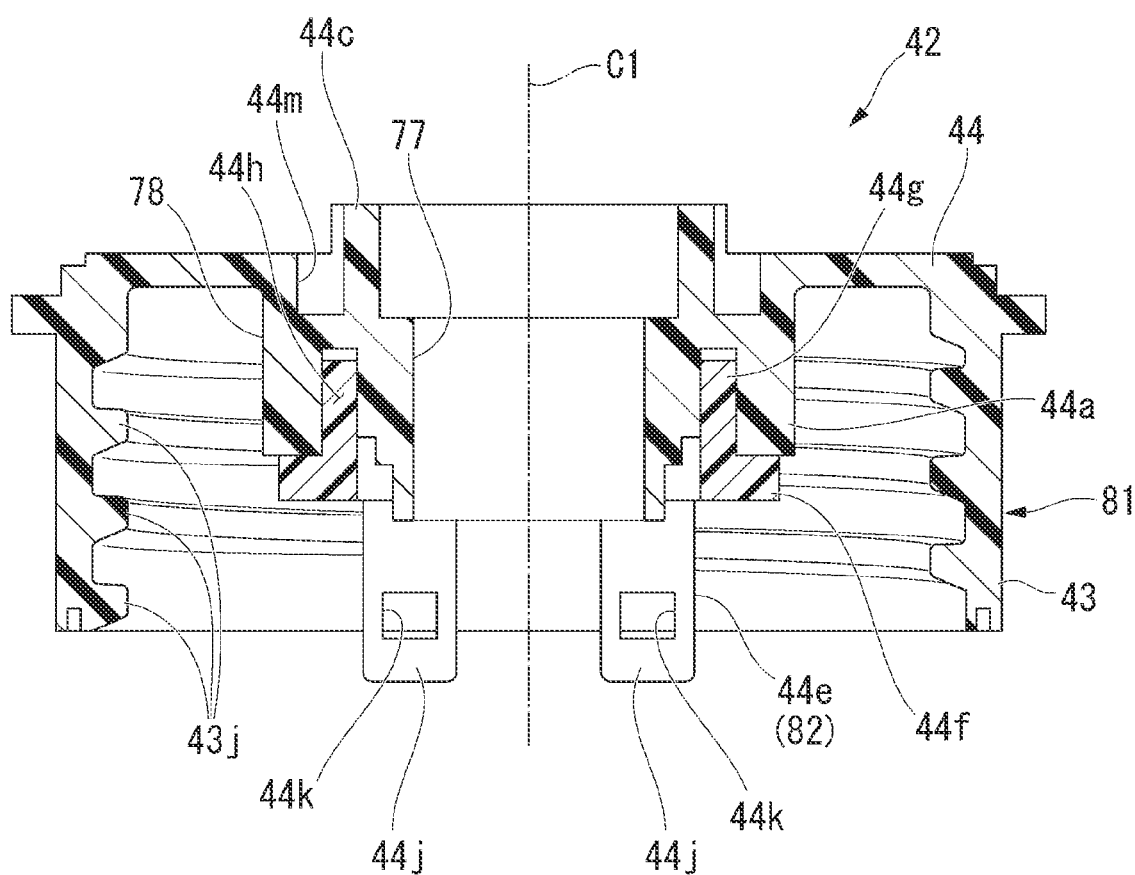
FIG. 8 is a cross-sectional view of a cap body according to the embodiment.

As illustrated in FIG. 8, the body extension portion 44e includes an annular portion 44f, a standing upright portion 44g, and downward extension portions 44j.

The annular portion 44f has a toric shape coaxial with the lower collar portion 44a. The external shape of the annular portion 44f is smaller than the outer diameter of the lower collar portion 44a.

The standing upright portion 44g stands upright from the annular portion 44f. The standing upright portion 44g has a cylindrical shape coaxial with the lower collar portion 44a. The standing upright portion 44g has a size which can be fitted into the gap 44h of the lower collar portion 44a.

The downward extension portions 44j extend downward from the annular portion 44f. A plurality of downward extension portions 44j are disposed at intervals in the circumferential direction of the annular portion 44f. The lower ends of the downward extension portions 44j are positioned below the lower end of the screw cylinder 43. In FIG. 8, two downward extension portions 44j are illustrated. An interlock hole 44k is open in the thickness direction of the downward extension portion 44j.

<Seal Member>

Figure 9:
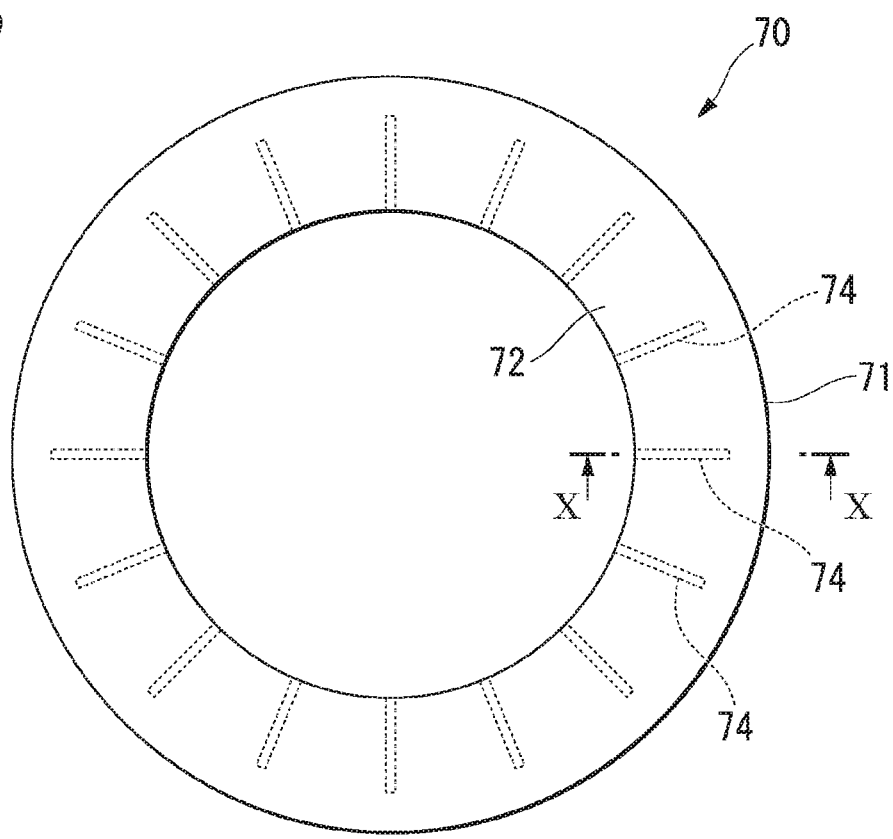
FIG. 9 is a plan view of a seal member according to the embodiment.
Figure 10:
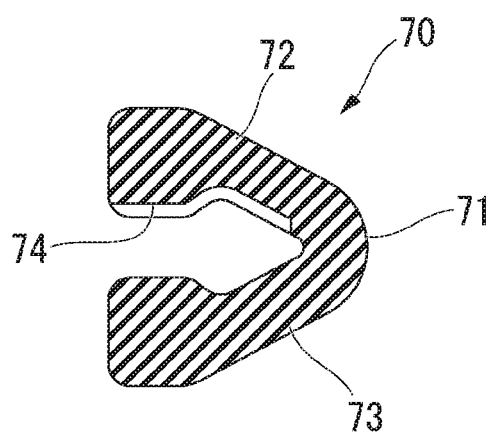
FIG. 10 is a cross-sectional view of a part taken along X-X in FIG. 9.

In a plan view in FIG. 9, the seal member 70 has a toric shape. In a cross-sectional view in FIG. 10, the seal member 70 has a V-shape open inward in the radial direction. The seal member 70 includes a ring portion 71 having a toric shape, an upper seal portion 72 extending obliquely upward from the ring portion 71, and a lower seal portion 73 extending obliquely downward from the ring portion 71. In a cross-sectional view in FIG. 10, notches 74 are formed in the upper seal portion 72 along the inner surface (surface facing the lower seal portion 73) of the upper seal portion 72. In a plan view in FIG. 9, a plurality of notches 74 are provided at intervals in the circumferential direction of the upper seal portion 72.

As illustrated in FIG. 6, the seal member 70 is fitted across the vertical area of the outer circumference of the lower collar portion 44a. The upper seal portion 72 is fitted to the base end (upper end) outer circumference of the lower collar portion 44a. The lower seal portion 73 is fitted to the distal end (lower end) outer circumference of the lower collar portion 44a. As illustrated in FIG. 2, when the oil filler cap 41 is fitted to the oil filler port cylinder body 37, the seal member 70 is sandwiched between the lower surface of the disk portion 44 and the upper end surface of the oil filler port cylinder body 37 (cap-fitting portion 38). When the seal member 70 illustrated in FIG. 2 is fitted, the seal member 70 is squashed in a direction along the screw axis C1. The lower portion (lower seal portion 73, refer to FIG. 10) of the seal member 70 forms a seal surface 70a of the oil filler cap 41.

As illustrated in FIG. 6, a groove 44m depressed downward from the upper surface of the disk portion 44 is provided in the cap body 42. The groove 44m is provided along the outer circumference of the upper collar portion 44c. The groove 44m functions as a thickness adjustment portion for preventing deformation of the seal surface 70a (refer to FIG. 2). In FIG. 6, the reference sign 59a indicates a collar member and the reference sign 59b indicates a seal member, respectively.

<Grip Portion>

As illustrated in FIG. 2, the grip portion 45 is attached to the cap body 42. The grip portion 45 functions as a knob for performing an operation of turning the oil filler cap 41. The grip portion 45 is provided so as to be relatively rotatable around the screw axis C1 with respect to the cap body 42.

Interlock claws 45a which engage with the outer circumferential portion of the cap body 42 so as to be relatively rotatable are provided in the inner side portion of the outer circumference of the grip portion 45. The ratchet mechanism 55 releasing a fastening torque equal to or larger than a specified torque is provided between the grip portion 45 and the cap body 42. A dust seal 58 is provided inside and outside the space where the ratchet mechanism 55 is disposed.

<Ventilation Passage Portion>

The ventilation passage portion 46 has a cylindrical shape coaxial with the screw axis C1. The ventilation passage portion 46 penetrates the cap body 42 and the grip portion 45 along the screw axis C1. The ventilation passage portion 46 allows the inside of the fuel tank 31 and the outside to communicate with each other.

The ventilation passage portion 46 includes a supported portion 46a supported by the cap body 42, and a nozzle portion 46b for connecting the charge piping 62.

The supported portion 46a is supported so as to be relatively rotatable by a central penetration portion 44d of the disk portion 44 with two stages of upper and lower seal members 46c interposed therebetween. The seal members 46c have an X-shape in a cross section and extends in the circumferential direction about the screw axis C1. A seal cap 46d prevents mud, sand, or the like from infiltrating into a space between a central opening of the grip portion 45 and the ventilation passage portion 46.

The nozzle portion 46b protrudes above the cap body 42 and the grip portion 45. The first end portion of the charge piping 62 is connected to a protrusion portion of the nozzle portion 46b. The second end portion of the charge piping 62 is connected to the canister 63 supported by the vehicle body (refer to FIG. 5).

<Valve Device>

The valve device 47 operates a float 49 in accordance with a fuel level position and opens and closes a communication port 47a (opening) which communicates with the ventilation passage portion 46.

The valve device 47 includes a valve case 48, the float 49, a bottom cap 51, and a spring 52 (biasing member).

As illustrated in FIG. 6, the valve case 48 has a cylindrical shape about the screw axis C1. The valve case 48 includes a case main body 48f, a small-diameter portion 48a, and a collar portion 48b.

The case main body 48f has a cylindrical shape about the screw axis C1. The case main body 48f includes a case extension portion 48k having a cylindrical shape extending upward along the screw axis C1 such that the case main body 48f overlaps the body extension portion 44e in the radial direction. The case extension portion 48k has an external shape with which the body extension portion 44e can interlock. An interlock claw 48j is formed in the case extension portion 48k.

The small-diameter portion 48a and the collar portion 48b protrude upward from the upper end portion of the case main body 48f. The small-diameter portion 48a has a cylindrical shape with a smaller diameter than the case main body 48f. The collar portion 48b is positioned outward from the small-diameter portion 48a in the radial direction. The collar portion 48b is shorter than the protrusion height of the small-diameter portion 48a.

The valve case 48 is attached to the cap body 42 by the following method. As illustrated in FIG. 6, the small-diameter portion 48a fitted into (inserted into) the inner circumference of the lower collar portion 44a, and the collar portion 48b is plugged into a gap of the lower collar portion 44a together with an O-ring 48c. Then, the restraint member 90 is attached to an overlapping portion 89 between the body extension portion 44e and the case extension portion 48k in the radial direction (refer to FIG. 7).

The float 49 is accommodated inside the valve case 48 in a vertically movable manner. The float 49 decreases in diameter in stages toward the upper side. A tapered valve body 49a is formed in the upper end portion of the float 49.

As illustrated in FIG. 2, the communication port 47a allowing the inside of the valve case 48 and the outside to communicate with each other is formed in the upper end portion of the valve case 48. Since the communication port 47a is blocked by the valve body 49a, an outflow of fuel is restricted. The valve body 49a extends toward the communication port 47a in the upper portion of the float 49.

A valve seat 48d is formed immediately below the communication port 47a in the upper end portion of the valve case 48 such that the valve body 49a of the float 49 becomes close to and away from the valve seat 48d. The valve body 49a and the valve seat 48d constitute a valve portion 49B of the valve device 47.

The bottom cap 51 blocks the lower end opening of the valve case 48. The bottom cap 51 has a disk-like external shape coaxial with the valve case 48. An opening 51a allowing evaporated fuel or the like to flow into the valve case 48 is formed in the bottom cap 51.

For example, the spring 52 is a coil spring. The spring 52 is provided in a shrunk manner between a central upper surface of the bottom cap 51 and a stepped surface of the lower inner side portion of the float 49. The spring 52 biases the float 49 upward (in the operation direction of the float 49).

A biasing force of the spring 52 is set such that the float 49 goes down due to the dead weight in a state in which the fuel level position is low and little buoyancy acts on the float 49.

A biasing force of the spring 52 is set such that the float 49 goes up, in a state in which buoyancy equal to or larger than a specified buoyancy acts on the float 49, when the sum of this buoyancy and the biasing force of the spring 52 exceeds the dead weight of the float 49.

Due to the foregoing setting, even if refueling is performed such that the lower end portion of the valve device 47 is submerged in fuel, buoyancy acting on the float 49 is small and the float 49 goes down due to the dead weight, so that the communication port 47a is opened. Accordingly, evaporated fuel inside the fuel tank 31 is sent to the canister 63 from the communication port 47a through the charge piping 62 (refer to FIG. 5).

On the other hand, when a great part of the valve device 47 is submerged in fuel due to a tilt or the like of the vehicle body, significant buoyancy acts on the float 49 due to the fuel which has infiltrated into the valve case 48. When the sum of this buoyancy and the biasing force of the spring 52 exceeds the dead weight of the float 49, the float 49 goes up and the communication port 47a is closed. That is, the valve device 47 constitutes a roll-over valve which is closed when a tilt of the vehicle body of the motorcycle 1 becomes equal to or larger than a specified tilt. Accordingly, when the motorcycle 1 falls down or the like, fuel inside the fuel tank 31 is prevented from flowing out to the canister 63 side from the communication port 47a (refer to FIG. 5).

Figure 4:
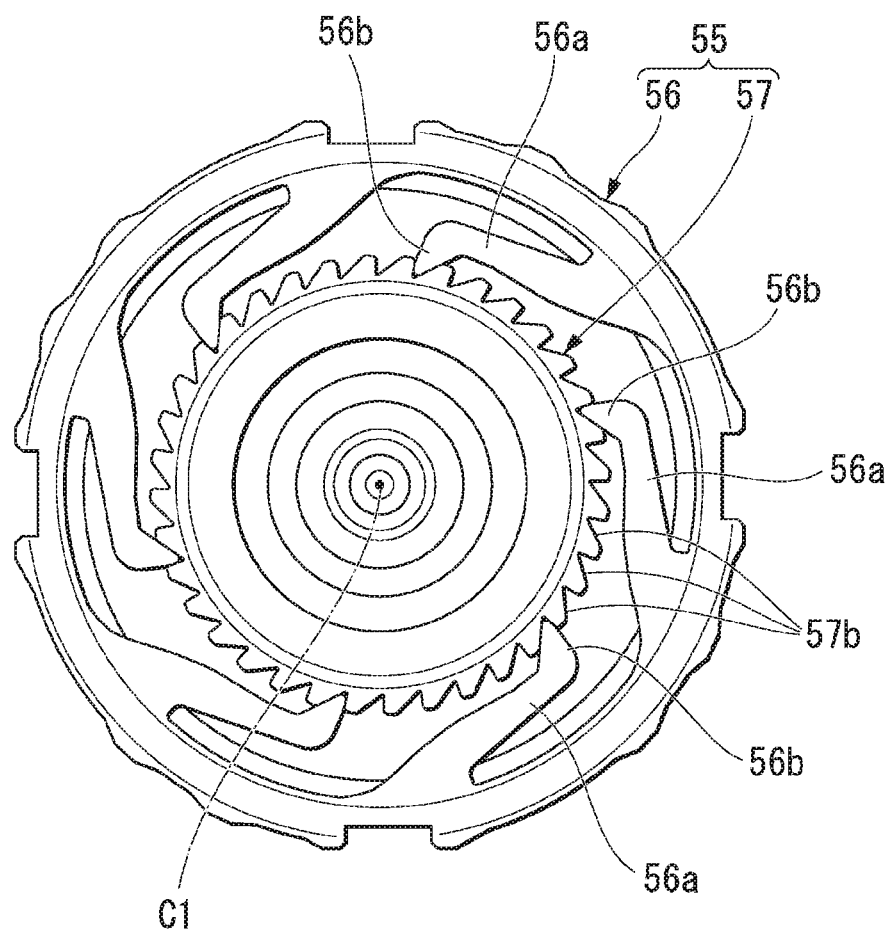
FIG. 4 is a plan view of a ratchet mechanism according to the embodiment.

FIG. 4 is a plan view of the ratchet mechanism 55 according to the embodiment viewed from below along the screw axis C1.

As illustrated in FIG. 4, the ratchet mechanism 55 includes an outer ring 56 and an inner ring 57.

The outer ring 56 includes a plurality of ratchet claws 56b disposed at intervals in the circumferential direction.

The inner ring 57 is disposed on the inner side of the outer ring 56 in the radial direction. The inner ring 57 includes a plurality of ratchet gear teeth 57b into which the plurality of ratchet claws 56b are fitted.

As illustrated in FIG. 2, the outer ring 56 is attached to the inner circumferential portion of the grip portion 45 in an integrally rotatable manner. The inner ring 57 is attached to the upper portion of the cap body 42 in an integrally rotatable manner.

As illustrated in FIG. 4, a plurality of elastic arms 56a are provided in the inner circumferential portion of the outer ring 56. The plurality of elastic arms 56a extend in a tilted manner such that they are positioned in a direction to the left toward the inner circumference side when viewed from below (below along the screw axis C1) the oil filler cap 41 (refer to FIG. 2).

One of the plurality of ratchet claws 56b protruding toward the inner circumference side is formed in the distal end portion of each of the plurality of elastic arms 56a. The plurality of ratchet claws 56b respectively engage with corresponding parts of the plurality of ratchet gear teeth 57b of the inner ring 57.

The screw of the oil filler cap 41 is a so-called forward screw which is fastened while being turned to the right when the screw is viewed from the head. The screw of the oil filler cap 41 is fastened by clockwise (counterclockwise in FIG. 4) rotation and is unfastened by counterclockwise (clockwise in FIG. 4) rotation. When the oil filler cap 41 is fastened, since the plurality of ratchet claws 56b of the plurality of elastic arms 56a engage with the plurality of ratchet gear teeth 57b, the grip portion 45 and the cap body 42 are integrally turned. Accordingly, the oil filler cap 41 can be fastened by gripping the grip portion 45 and rotating it clockwise (counterclockwise in FIG. 4).

After the oil filler cap 41 is fastened, the seal member 70 (refer to FIG. 2) is compressed and the oil filler port 38a is closed. When the grip portion 45 is further rotated clockwise from here, rotation of the cap body 42 is inhibited due to an elastic reaction force of the seal member 70 or the like, so that a relative torque acts between the cap body 42 and the grip portion 45. When the relative torque becomes equal to or larger than a specified torque, the ratchet mechanism 55 causes each of the plurality of elastic arms 56a to be elastically deformed and changes the engagement position of each of the plurality of ratchet gear teeth 57b with respect to the plurality of ratchet claws 56b. Accordingly, the grip portion 45 relatively rotates with respect to the cap body 42 so that a fastening torque is released.

When the fastened oil filler cap 41 is unfastened, even if a relative torque acts between the cap body 42 and the grip portion 45, the ratchet mechanism 55 can transfer a torque without causing each of the plurality of elastic arms 56a to be elastically deformed.

<Restraint Member>

Figure 7:
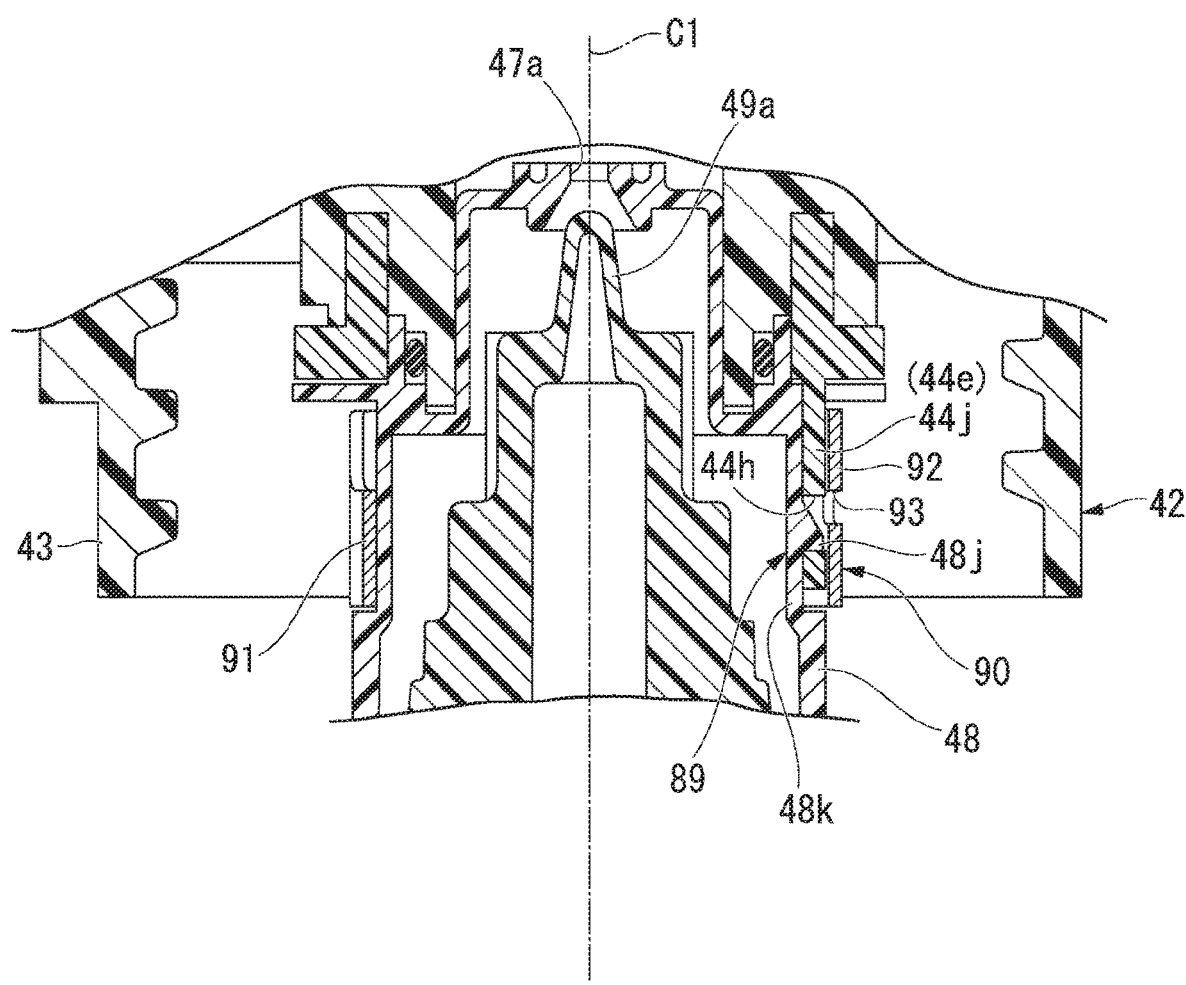
FIG. 7 is a cross-sectional view of a main part of the tank cap structure according to the embodiment.

As illustrated in FIG. 7, the restraint member 90 restrains the overlapping portion 89 between the body extension portion 44e and the case extension portion 48k in the radial direction from the outside in the radial direction. As illustrated in FIG. 11, the restraint member 90 has an open ring shape. For example, the restraint member 90 is made of a metal. The restraint member 90 generates a biasing force on the inner side in the radial direction when being attached to the overlapping portion 89 (refer to FIG. 7).

The restraint member 90 includes press portions 92 and inward projection portions 91.

The press portions 92 constitute an outermost shell portion of the restraint member 90. A plurality of press portions 92 are disposed at intervals in the circumferential direction of the restraint member 90. The press portions 92 press the overlapping portion 89 from the outside in the radial direction. A penetration hole 93 open in the pressurization direction (thickness direction of the press portion 92) is formed in the press portion 92.

The inward projection portions 91 further protrude inward in the radial direction than the press portions 92. A plurality of inward projection portions 91 are disposed at intervals in the circumferential direction of the restraint member 90. The inward projection portion 91 joins two press portions 92 adjacent to each other in the circumferential direction. The press portions 92 and the inward projection portions 91 are alternately disposed in the circumferential direction of the restraint member 90. The inward projection portions 91 are disposed in parts in which no interlock claw 48j is provided (parts in which no downward extension portion 44j is provided) in the case extension portion 48k (refer to FIG. 7). A gap 94 is provided in a portion of the restraint member 90 in the circumferential direction.

The restraint member 90 is attached to the overlapping portion 89 by the following method. First, the restraint member 90 is opened outward in the radial direction. Next, the opened restraint member 90 is disposed in the overlapping portion 89.

At this time, the penetration hole 93 of the press portion 92 is caused to correspond to an interlock portion between the body extension portion 44e and the case extension portion 48k (interlock portion of the interlock claw 48j with respect to the interlock hole 44k) (refer to FIG. 7). An insertion jig which is movable along the valve case 48, a pushing jig which can move the restraint member 90 along the valve case 48, or the like (not illustrated) may be prepared.

As described above, the tank cap structure of the foregoing embodiment includes the cap body 42 that is screwed to the oil filler port cylinder body 37 of the fuel tank 31 and blocks the oil filler port 38a, the grip portion 45 that is provided so as to be relatively rotatable around the screw axis C1 with respect to the cap body 42, the valve device 47 that operates the float 49 in accordance with the fuel level position and opens and closes the communication port 47a restricting an outflow of fuel, and the ratchet mechanism 55 that is provided between the grip portion 45 and the cap body 42 and manages a fastening torque of the cap body 42. The valve device 47 includes the valve case 48 which has a cylindrical shape about the screw axis C1 and accommodates the float 49, and the valve body 49a which a tapered shape thinner than the valve case 48 and extends toward the communication port 47a. The cap body 42 includes the cylindrical receiving portion 44a which has a cylindrical shape about the screw axis C1. The seal-receiving portion 78 receiving the seal member 70 held between the cap body 42 and the oil filler port cylinder body 37 is provided on the outer circumferential surface of the cylindrical receiving portion 44a. The valve-receiving portion 77 receiving the valve device 47 inserted into the inner circumference of the cylindrical receiving portion 44a is provided on the inner circumferential surface of the cylindrical receiving portion 44a.

According to this configuration, since the seal-receiving portion 78 receiving the seal member 70 held between the cap body 42 and the oil filler port cylinder body 37 is provided on the outer circumferential surface of the cylindrical receiving portion 44a, while airtightness of the seal member 70 can be ensured by the seal-receiving portion 78, increase in size of the oil filler cap 41 in the height direction can be curbed. Moreover, since the valve-receiving portion 77 receiving the valve device 47 inserted into the inner circumference of the cylindrical receiving portion 44a is provided on the inner circumferential surface of the cylindrical receiving portion 44a, increase in size of the oil filler cap 41 in the height direction can be curbed while an advantage that the valve device 47 can be positionally aligned by the valve-receiving portion 77 is achieved. That is, while airtightness of the seal member 70 can be ensured and the valve device 47 can be positionally aligned, increase in size of the oil filler cap 41 in the height direction can be curbed by the inner and outer circumferences of the cylindrical receiving portion 44a. Therefore, while increase in size of the oil filler cap 41 can be curbed, the float 49 having sufficient buoyancy can be disposed.

In the foregoing embodiment, since the valve device 47 includes the spring 52 which biases the float 49 in the operation direction of the float 49, leakage of fuel through the communication port 47a can be prevented when the fuel tank 31 tilts.

In the foregoing embodiment, since the tank cap structure further includes the restraint member 90 that restrains the overlapping portion 89 between the body extension portion 44e and the case extension portion 48k in the radial direction from the outside in the radial direction, the vibration durability of the oil filler cap 41 is improved.

In the foregoing embodiment, since the cap body 42 is constituted of two members such as the first member 81 having the cylindrical receiving portion 44a and the second member 82 having the body extension portion 44e, the following effects are exhibited. Facilitation of making the oil filler cap 41 and improvement of dimensional accuracy (prevention of shrinkage of a resin thick-wall portion) are achieved in parallel, so that productivity is improved.

In the foregoing embodiment, since the cap body 42 includes the screw cylinder 43 which is positioned outward from the cylindrical receiving portion 44a in the radial direction and in which threads to be screwed to the oil filler port cylinder body 37 are formed in the inner circumference, and the cylindrical receiving portion 44a is positioned inside the oil filler port 38a over the upper end of the oil filler port cylinder body 37, the following effects are exhibited. Due to the structure in which the cylindrical receiving portion 44a of the cap body 42 is inserted deep into the oil filler port 38a, while a fastening force of a screwed portion between the cap body 42 and the oil filler port cylinder body 37 is enhanced, the width of the seal-receiving portion 78 can be ensured. Therefore, attachment strength and sealing efficiency of the cap body 42 can be achieved in parallel.

In the foregoing embodiment, since the oil filler port cylinder body 37 is made of a resin, and the threads are formed by the trapezoidal screw portions 43j having a trapezoidal shape, the following effects are exhibited. Sufficient attachment strength and sealing efficiency can be achieved for the oil filler port cylinder body 37 made of a resin exhibiting a significant dimensional change in response to temperature change.

In the foregoing embodiment, since the motorcycle 1 includes the tank cap structure, while increase in size of the oil filler cap 41 is curbed, a float 49 having sufficient buoyancy can be disposed.

In the foregoing embodiment, the valve portion 49B of the valve device 47 is disposed within a vertical range H1 (within a vertical area of the screw cylinder 43) between lower ends 43d (which are also the lower end of the screw cylinder 43) of the screw portions 43j screwed to the oil filler port cylinder body 37 in the cap body 42, and the seal surface 70a of the seal member 70 positioned above the screw portions 43j. Accordingly, the downward protruding amount of the valve device 47 can be reduced and increase in size of the oil filler cap 41 in the height direction can be curbed.

Moreover, since the ratchet mechanism 55 managing a fastening torque is provided between the grip portion 45 and the cap body 42, the fastening margin for the screw portions 43j of the oil filler cap 41 can be uniformly retained. Accordingly, facilitation of attachment and detachment of the oil filler cap 41 and reliable blocking of the oil filler port 38a can be achieved in parallel.

Moreover, since the ratchet mechanism 55 is disposed on the outer circumference side of the ventilation passage portion 46 leading to the upper portion of the valve portion 49B, while an advantage obtained by providing the ratchet mechanism 55 is achieved, increase in size of the oil filler cap 41 in the height direction can be curbed.

In the foregoing embodiment, since the ventilation passage portion 46 penetrates the cap body 42 along the screw axis C1 and is supported so as to be relatively rotatable by the penetration portion 44d of the cap body 42 with the seal members 46c interposed therebetween, the following effects are exhibited.

Even in a configuration in which a piping is connected to the ventilation passage portion 46, the ventilation passage portion 46 rotates when an operation of fastening the oil filler cap 41 is performed. Accordingly, the piping does not rotate, so that operability can be improved.

In the foregoing embodiment, since the ventilation passage portion 46 is connected to the canister 63 supported by the vehicle body side via the charge piping 62, the following effects are exhibited.

Since the ventilation passage portion 46 can rotate, distortion or the like of the charge piping 62 can be prevented, and the durability and a wire routing state of the charge piping 62 can be favorably maintained. Moreover, an operation of fastening the oil filler cap 41 can be favorably performed.

In the foregoing embodiment, since the oil filler cap 41 is disposed in the upper portion and a laterally central portion of the fuel tank 31, the following effects are exhibited.

Since the valve device 47 is positioned in the upper portion of the fuel tank 31, during a normal time in which the inclination of the fuel level is small, the ventilation passage portion 46 can be opened by disposing the float 49 above the fuel level.

On the other hand, when the vehicle body tilts or the like, the ventilation passage portion 46 can be sensitively blocked by causing the float 49 to react to the inclination of the fuel level.

Since the valve device 47 is positioned in a laterally central portion of the fuel tank 31, the float 49 can equally react even when the vehicle body tilts to either the left or the right.

In the foregoing embodiment, since the fuel tank 31 has the bulge-shaped portion 32a which is decreased in size in a horizontal cross-sectional area toward the oil filler port cylinder body 37 and is provided around the oil filler port cylinder body 37, the following effects are exhibited.

Since the space inside the tank immediately below the oil filler port cylinder body 37 is narrowed, the fuel level significantly changes when the vehicle body tilts or the like, so that the reaction sensitivity of the float 49 can be enhanced.

Modification Example

The foregoing embodiment has been described based on an example in which the cap body 42 is constituted of two members such as the first member 81 having the cylindrical receiving portion 44a and the second member 82 having the body extension portion 44e. However, the embodiment is not limited thereto. For example, the cap body 42 may be constituted of only one member.

The foregoing embodiment has been described based on an example in which the oil filler port cylinder body 37 is made of a resin. However, the embodiment is not limited thereto. For example, the oil filler port cylinder body 37 may be made of a metal.

The foregoing embodiment has been described based on an example in which the threads of the cap body 42 are formed by the trapezoidal screw portions 43j having a trapezoidal shape. However, the embodiment is not limited thereto. For example, the threads of the cap body 42 may have a shape other than the trapezoidal shape. The threads of the cap body 42 may have a shape corresponding to those of the threads of the oil filler port cylinder body 37.

The foregoing embodiment has been described based on an example in which the fuel tank 31 (tank main body 32) is made of a resin. However, the embodiment is not limited thereto. For example, the tank main body may be made of pure titanium.

Figure 12:
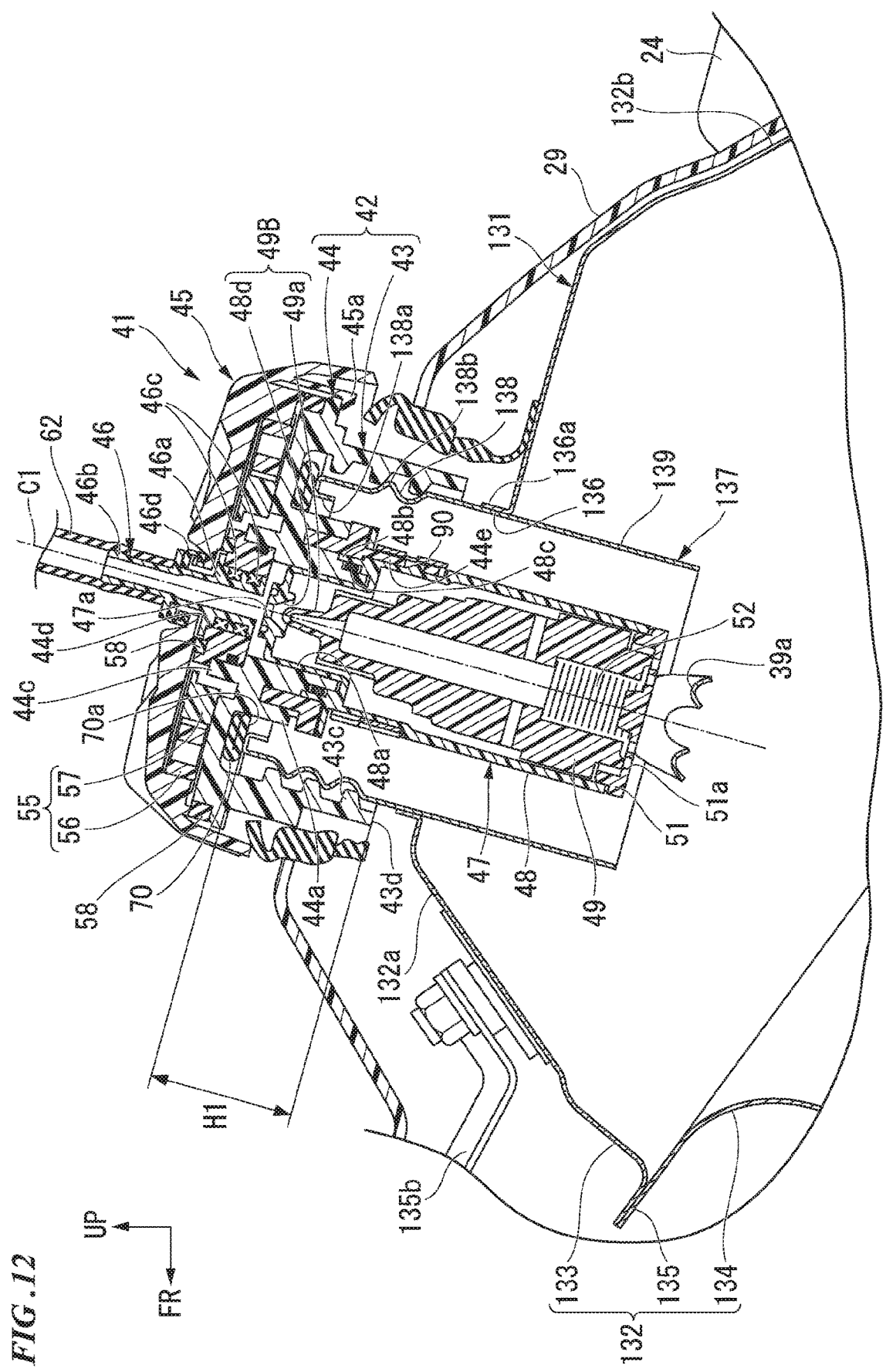
FIG. 12 is a cross-sectional view of a part around an oil filler port of a fuel tank according to a modification example of the embodiment.
Figure 13:
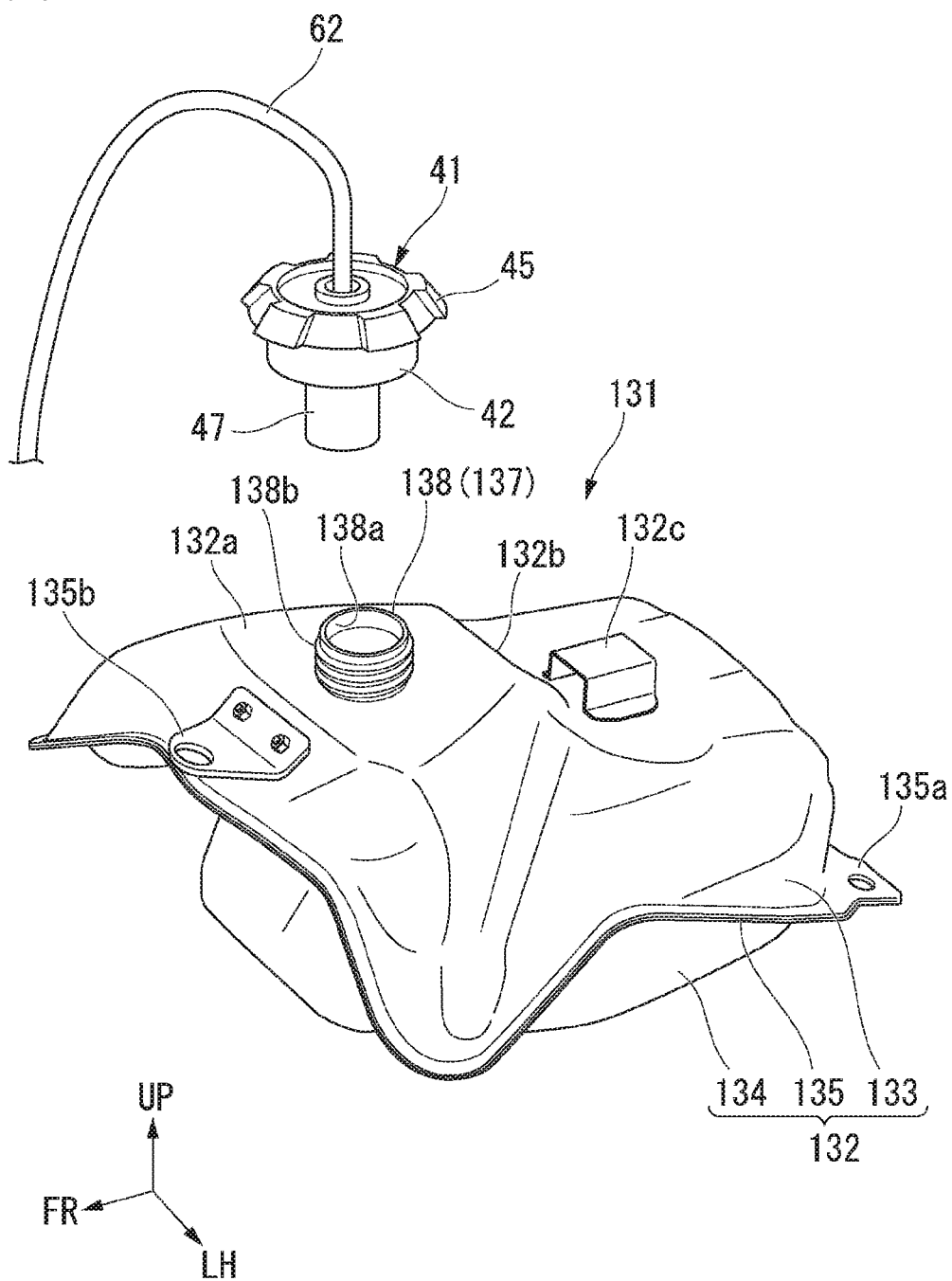
FIG. 13 is a perspective view of the fuel tank according to the modification example of the embodiment.

FIGS. 12 and 13 illustrate an example of a pure titanium tank main body 132.

As illustrated in FIG. 12, the tank main body 132 includes an upper half body 133 which forms the upper portion of the tank main body 132, and a lower half body 134 which forms the lower portion of the tank main body 132. The tank main body 132 forms an integrated hollow structure with the upper and lower half bodies 133 and 134 which are coupled to each other. A bonding flange 135 is provided between the upper and lower half bodies 133 and 134 along the division surface between the upper and lower half bodies 133 and 134.

As illustrated in FIG. 13, mount portions 135a for rubber-mounting the rear portion of a fuel tank 131 to the vehicle body frame 5 (refer to FIG. 1) are provided in both side portions of the rear portion of the bonding flange 135. A penetration hole which is open in the thickness direction of the bonding flange 135 is formed in the mount portion 135a.

A mount bracket 135b for rubber-mounting the front portion of the fuel tank 131 to the vehicle body frame 5 is provided in the front portion of the upper half body 133. The mount bracket 135b is fastened to the front portion of the upper half body 133 using a pair of left and right bolts.

As illustrated in FIG. 12, a circular insertion port 136 which is open upward is formed in the upper end portion of the upper half body 133. The insertion port 136 is positioned in the middle of the upper end portion of the upper half body 133 in the vehicle width direction. An oil filler port cylinder body 137 (oil filler port portion) having a cylindrical shape is bonded to the insertion port 136.

The oil filler port cylinder body 137 is made of a resin.

The oil filler port cylinder body 137 integrally has a cap-fitting portion 138 which protrudes above the tank main body 132, and a downward extending portion 139 which faces the inside of the tank main body 132. The upper end opening of the oil filler port cylinder body 137 constitutes an oil filler port 138a.

Threads 138b for screwing the oil filler cap 41 are formed in the outer circumference of the cap-fitting portion 138.

The downward extending portion 139 has a cylindrical shape with a flat outer circumferential surface. The downward extending portion 139 is inserted into the tank through the insertion port 136. For example, the oil filler port cylinder body 137 is bonded to a circumferential edge flange 136a of the insertion port 136 by seam welding or the like.

A bulge-shaped portion 132a having a shape bulging upward is provided in the front upper portion (around the oil filler port cylinder body 137) of the upper half body 133 of the fuel tank 131. The bulge-shaped portion 132a is formed so as to be decreased in size in a horizontal cross-sectional area while going upward toward the oil filler port cylinder body 137. A seat alignment portion 132b, which is inclined downward to the rear and on which the front portion of the seat 24 is mounted, is formed in the rear portion of the bulge-shaped portion 132a.

A hat-shaped interlock stay 132c (refer to FIG. 13) is coupled to the upper surface of the seat alignment portion 132b by welding or the like. The interlock stay 132c has a plug-in port (not illustrated) which is open rearward. When an interlock claw (not illustrated) on the lower surface of the front portion of the seat 24 is plugged into the plug-in port of the interlock stay 132c, the front portion of the seat 24 is interlocked with the interlock stay 132c.

The present invention is not limited to the foregoing embodiment, and various modification examples can be conceived within the technical scope thereof.

For example, the foregoing embodiment has described an example which is applied to a motorcycle for off-road traveling. However, the purpose of the vehicle is not limited at all.

For example, saddle-type vehicles include all vehicles on which a rider rides while straddling the vehicle body and include not only motorcycles (including motorized bicycles and scooter-type vehicles) but also three-wheeled vehicles (including vehicles with two front wheels and one rear wheel, in addition to vehicles with one front wheel and two rear wheels). In addition, the present invention can be applied to not only motorcycles but also four-wheeled vehicles such as automobiles.

As such, the configurations in the foregoing embodiment are merely examples of the present invention, and various changes can be made within a range not departing from the gist of the present invention. For example, the constituent elements of the embodiment can be replaced with known constituent elements.

What is claimed is:

1. A tank structure, comprising:
   a cap body that is screwed to an oil filler port portion of a fuel tank and blocks an oil filler port;
   a grip portion that is provided so as to be relatively rotatable around a screw axis with respect to the cap body;
   a valve device that operates a float in accordance with a fuel level position and opens and closes an opening restricting an outflow of fuel; and
   a ratchet mechanism that is provided between the grip portion and the cap body and manages a fastening torque of the cap body,
   wherein the valve device includes
   a valve case which has a cylindrical shape about the screw axis and accommodates the float, and
   a valve body which has a tapered shape thinner than the valve case and extends toward the opening,
   wherein the cap body includes a cylindrical receiving portion which has a cylindrical shape about the screw axis, wherein a seal-receiving portion receiving a seal member held between the cap body and the oil filler port portion is provided on an outer circumferential surface of the cylindrical receiving portion, wherein a valve-receiving portion receiving the valve device inserted into an inner circumference of the cylindrical receiving portion is provided on an inner circumferential surface of the cylindrical receiving portion, wherein the cap body includes a body extension portion which has a cylindrical shape extending downward along the screw axis from the cylindrical receiving portion, wherein the valve case includes a case extension portion which has a cylindrical shape extending upward along the screw axis such that the case extension portion overlaps the body extension portion in a radial direction, and wherein the tank structure further comprises a restraint member that restrains an overlapping portion between the body extension portion and the case extension portion in the radial direction from the outside in the radial direction.

2. The tank structure according to claim 1,
wherein the valve device includes a biasing member which biases the float in an operation direction of the float.

3. The tank structure according to claim 1,
wherein the cap body is constituted of two members such as a first member having the cylindrical receiving portion and a second member having the body extension portion.

4. The tank structure according to claim 1,
wherein the cap body includes a screw cylinder which is positioned outward from the cylindrical receiving portion in the radial direction and in which a thread to be screwed to the oil filler port portion is formed on an inner circumference, and
wherein the cylindrical receiving portion is positioned inside the oil filler port over an upper end of the oil filler port portion.

5. The tank structure according to claim 4,
wherein the oil filler port portion is made of a resin, and
wherein the thread is formed by a trapezoidal screw portion having a trapezoidal shape.

6. A saddle-type vehicle, comprising:
the tank structure according to claim 1.

* * * * *